(12) United States Patent
Fix

(10) Patent No.: US 12,537,373 B2
(45) Date of Patent: Jan. 27, 2026

(54) SYSTEMS AND METHODS FOR A SAFETY CRITICAL SWITCHING CIRCUIT

(71) Applicant: The Boeing Company, Arlington, VA (US)

(72) Inventor: Brian Eric Fix, Hood River, OR (US)

(73) Assignee: The Boeing Company, Arlington, VA (US)

( * ) Notice: Subject to any disclaimer, the term of this patent is extended or adjusted under 35 U.S.C. 154(b) by 44 days.

(21) Appl. No.: 18/611,055

(22) Filed: Mar. 20, 2024

(65) Prior Publication Data

US 2025/0300447 A1    Sep. 25, 2025

(51) Int. Cl.
   *G01R 31/327*     (2006.01)
   *H01H 9/16*       (2006.01)
   *H01H 71/04*      (2006.01)
   *H02H 7/08*       (2006.01)
   *H03K 17/18*      (2006.01)

(52) U.S. Cl.
   CPC ........... *H02H 7/08* (2013.01); *G01R 31/3275* (2013.01); *H01H 9/16* (2013.01); *H03K 17/18* (2013.01); *H01H 2071/042* (2013.01)

(58) Field of Classification Search
   CPC .... G01R 31/327; G01R 31/3275; H01H 9/16; H01H 47/002; H01H 71/04; H01H 2071/042; H01H 83/04; H03K 17/18
   See application file for complete search history.

(56) References Cited

U.S. PATENT DOCUMENTS

| | | | |
|---|---|---|---|
| 5,488,323 A * | 1/1996 | Beacham, Jr. ......... | H01H 9/167 324/500 |
| 2008/0018310 A1 * | 1/2008 | Lee ...................... | H03K 17/082 323/235 |
| 2016/0182039 A1 * | 6/2016 | Xiao ...................... | H03K 17/18 307/115 |

* cited by examiner

*Primary Examiner* — Levi Gannon
(74) *Attorney, Agent, or Firm* — Harrity & Harrity, LLP

(57) ABSTRACT

A method, computer program product, and circuit for monitoring a plurality of signals as input from a switch. It may be detected whether a current state of the switch is valid based upon, at least in part, the plurality of signals. When the current state of the switch is valid, use of the current state of the switch may be enabled as an output. When the current state of the switch is invalid, use of the current state of the switch may be disabled while a previous valid state is held in memory and maintained on the output.

20 Claims, 6 Drawing Sheets

SYSTEMS AND METHODS FOR A SAFETY CRITICAL SWITCHING CIRCUIT

BACKGROUND

Having safety measures in place is important for numerous reasons. An example is the use of safety equipment to detect when there may be undesired operation of rotors at a time when personnel may be too close to the rotors, or when there is an undesired disruption of the rotors at a time when an aerial vehicle is in flight.

SUMMARY

In one example implementation, a method, performed by one or more computing devices, may include but is not limited to monitoring a plurality of signals as input from a switch. It may be detected whether a current state of the switch is valid based upon, at least in part, the plurality of signals. When the current state of the switch is valid, use of the current state of the switch may be enabled as an output. When the current state of the switch is invalid, use of the current state of the switch may be disabled as the output.

One or more of the following example features may be included. The current state of the switch may be valid when a first signal of the plurality of signals is complementary to a second signal of the plurality of signals. Disabling use of the current state of the switch as the output may include holding a previous valid state. Disabling use of the current state of the switch as the output may further include ignoring changes to the previous valid state until the current state of the switch is detected as valid. The previous valid state may be held in memory. Detecting whether the current state of the switch is valid may include duplicating the plurality of signals down parallel paths. Asymmetric timing may be set for the plurality of signals duplicated down the parallel paths.

In another example implementation, a circuit may be configured to perform operations that may include but are not limited to monitoring a plurality of signals as input from a switch. It may be detected whether a current state of the switch is valid based upon, at least in part, the plurality of signals. When the current state of the switch is valid, use of the current state of the switch may be enabled as an output. When the current state of the switch is invalid, use of the current state of the switch may be disabled as the output.

One or more of the following example features may be included. The current state of the switch may be valid when a first signal of the plurality of signals is complementary to a second signal of the plurality of signals. Disabling use of the current state of the switch as the output may include holding a previous valid state. Disabling use of the current state of the switch as the output may further include ignoring changes to the previous valid state until the current state of the switch is detected as valid. The previous valid state may be held in memory. Detecting whether the current state of the switch is valid may include duplicating the plurality of signals down parallel paths. Asymmetric timing may be set for the plurality of signals duplicated down the parallel paths.

In another example implementation, a computer program product may reside on a computer readable storage medium having a plurality of instructions stored thereon which, when executed across one or more processors, may cause at least a portion of the one or more processors to perform operations that may include but are not limited to monitoring a plurality of signals as input from a switch. It may be detected whether a current state of the switch is valid based upon, at least in part, the plurality of signals. When the current state of the switch is valid, use of the current state of the switch may be enabled as an output. When the current state of the switch is invalid, use of the current state of the switch may be disabled as the output.

One or more of the following example features may be included. The current state of the switch may be valid when a first signal of the plurality of signals is complementary to a second signal of the plurality of signals. Disabling use of the current state of the switch as the output may include holding a previous valid state. Disabling use of the current state of the switch as the output may further include ignoring changes to the previous valid state until the current state of the switch is detected as valid. The previous valid state may be held in memory. Detecting whether the current state of the switch is valid may include duplicating the plurality of signals down parallel paths. Asymmetric timing may be set for the plurality of signals duplicated down the parallel paths.

The details of one or more example implementations are set forth in the accompanying drawings and the description below. Other possible example features and/or possible example advantages will become apparent from the description, the drawings, and the claims. Some implementations cannot have those possible example features and/or possible example advantages, and such possible example features and/or possible example advantages can not necessarily be required of some implementations.

BRIEF DESCRIPTION OF THE DRAWINGS

Like reference symbols in the various drawings can indicate like elements.

DESCRIPTION

Figure 1:
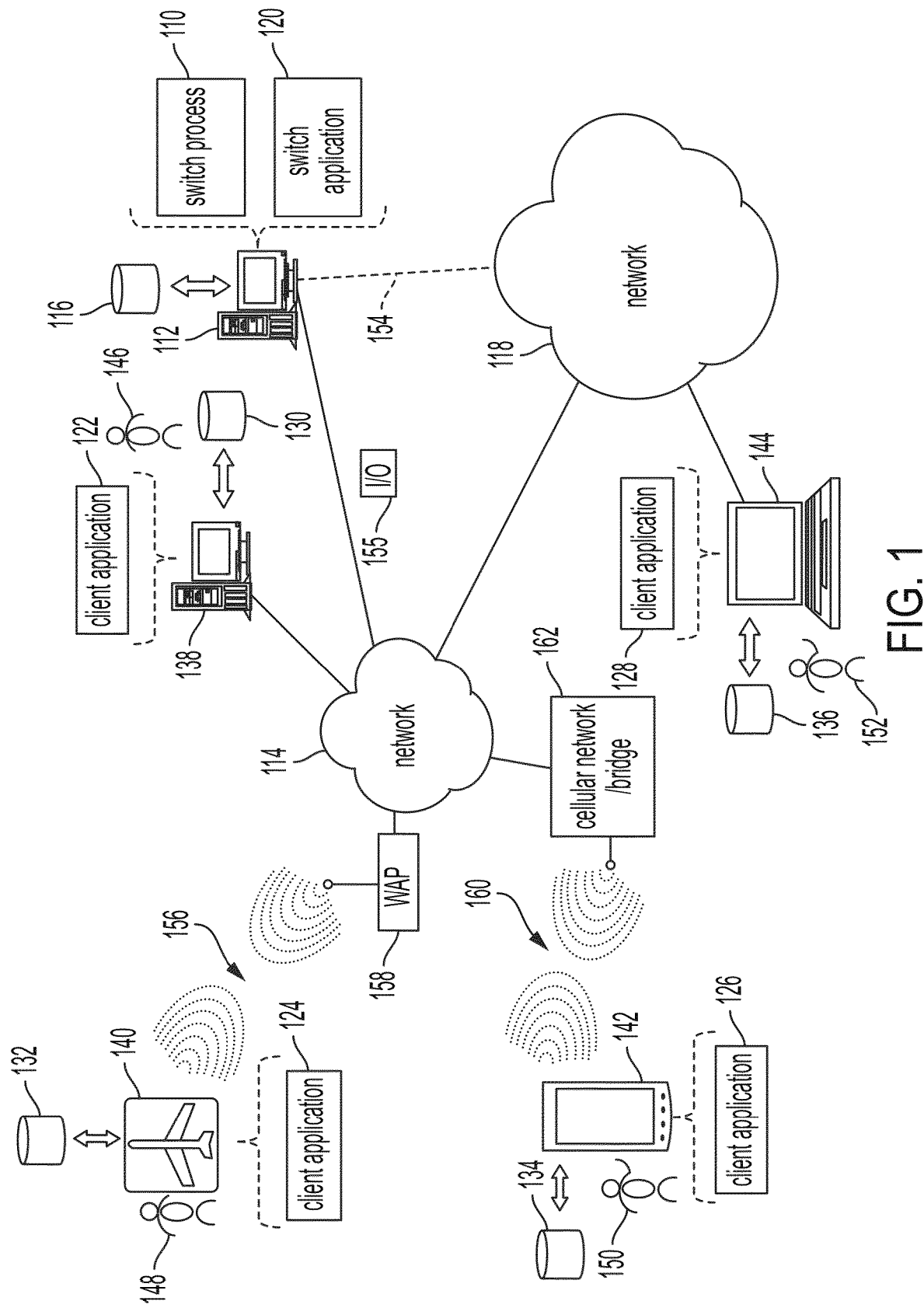
FIG. 1 is an example diagrammatic view of a switch process coupled to an example distributed computing network according to one or more example implementations of the disclosure.

Having safety measures in place is important for numerous reasons. An example is the use of safety equipment to detect when there may be undesired operation of rotors at a time when personnel may be too close to the rotors, or when there is an undesired disruption of the rotors at a time when an aerial vehicle is in flight. Some systems may detect a switch with an invalid state and then still allow the unwanted state change to propagate to other controls/components that could disrupt operation of, e.g., rotors, etc. and cause unsafe operation of any number of things, such as an unmanned aerial vehicle (UAV). Moreover, a single pole single throw switch has an on/off state, that looks exactly like a shorted failure or an open failure, meaning that if one had a shorted out contact on it, this simply would look just like the switch is closed, and the system would not know anything different. Similarly, if a cable was unplugged, this simply would look like it was off without the system knowing anything different. Thus, with such a switch, valid states and invalid states overlap each other. Therefore, as will be discussed in greater detail below, the present disclosure includes a switch circuit that increases safety of, e.g., a single pole single throw switch by incorporating digital logic to validate, latch, and flag the output. This prevents inadvertent switching due to, e.g., switch bounce, disconnects, short circuits, and power failures, to the switch. In some implementations, it may indicate to the operator if the read switch position is valid and if a failure is detected. If a failure is detected, the output may be latched, preventing an error state from propagating through the system.

In some implementations, the present disclosure may be done with little or no software, as that may require more resources, may be redundant, and may be prone to errors. For instance, some systems may use a microprocessor with code dedicated to flight safety; however, a hardware solution may be preferred, as it is easier to validate, there are fewer states, and software validation for safety critical issues are much more involved (e.g., a software solution monitoring a switch may require complicated filtering and a lot of logic to identify what a valid state is versus an invalid state. By contrast, the present disclosure may provide an elegant solution by using complimentary inputs.

As will be discussed in greater detail below, a D-latch (Data latch or Transparent Latch) may be used as a type of digital storage device, a flip-flop or latch, which is used to store and stabilize data in digital circuits, capturing the value of the data input (D) at a particular moment and holding onto it until instructed to release or change it.

Here is how a D-latch typically works:
1. Data Input (D): This is where the signal that is to be stored is applied.
2. Enable or Control Input (C or E): This input determines when the D-latch is "open" to capturing the input data. When the enable line is active (often when it is at a high voltage level), the value at the D input is transferred to the output (Q).
3. Output (Q): This reflects the value stored in the latch. There may also be a complementary output, often denoted as $\overline{Q}$, which is the inverse of Q.

When the enable signal is active, the D-latch is transparent, meaning that the output immediately follows the input. When the enable signal is inactive, the last value of the D input is "latched" or retained at the output, even if the input changes.

The D-latch is similar but different from a D flip-flop in that a flip-flop has a clock input instead of an enable input and captures the input only on a rising or falling edge of the clock signal. In contrast, the D-latch will continue to pass the input to the output as long as the enable signal remains active. D-latches may be used in digital systems where temporary storage of data is needed as part of a larger process, such as in registers, memory units, and various types of synchronous and asynchronous circuits. It will be appreciated after reading the present disclosure that any type of memory may be used without departing from the scope of the present disclosure. As such, the use of a D-latch or any other type of memory should be taken as example only and not to otherwise limit the scope of the present disclosure.

In some implementations, the present disclosure can be embodied as a method, system, or computer program product. Accordingly, in some implementations, the present disclosure can take the form of an entirely hardware implementation, an entirely software implementation (including firmware, resident software, micro-code, etc.) or an implementation combining software and hardware aspects that can all generally be referred to herein as a "circuit," "module" or "system." Furthermore, in some implementations, the present disclosure can take the form of a computer program product on a computer-usable storage medium having computer-usable program code embodied in the medium.

Software can include artificial intelligence systems, which can include machine learning or other computational intelligence. For example, artificial intelligence (AI) can include one or more models used for one or more problem domains. When presented with many data features, identification of a subset of features that are relevant to a problem domain can improve prediction accuracy, reduce storage space, and increase processing speed. This identification can be referred to as feature engineering. Feature engineering can be performed by users or can only be guided by users. In various implementations, a machine learning system can computationally identify relevant features, such as by performing singular value decomposition on the contributions of different features to outputs.

In some implementations, the various computing devices can include, integrate with, link to, exchange data with, be governed by, take inputs from, and/or provide outputs to one or more AI systems, which can include models, rule-based systems, expert systems, neural networks, deep learning systems, supervised learning systems, robotic process automation systems, natural language processing systems, intelligent agent systems, self-optimizing and self-organizing systems, and others. Except where context specifically indicates otherwise, references to AI, or to one or more examples of AI, should be understood to encompass one or more of these various alternative methods and systems; for example, without limitation, an AI system described for enabling any of a wide variety of functions, capabilities and solutions described herein (such as optimization, autonomous operation, prediction, control, orchestration, or the like) should be understood to be capable of implementation by operation on a model or rule set; by training on a training data set of human tag, labels, or the like; by training on a training data set of human interactions (e.g., human interactions with software interfaces or hardware systems); by training on a training data set of outcomes; by training on an AI-generated training data set (e.g., where a full training data set is generated by AI from a seed training data set); by supervised learning; by semi-supervised learning; by deep learning; or the like. For any given function or capability that is described herein, neural networks of various types can be used, including any of the types described herein, and in embodiments a hybrid set of neural networks can be selected such that within the set a neural network type that is more favorable for performing each element of a multi-function or multi-capability system or method is implemented. As one example among many, a deep learning, or black box, system can use a gated recurrent neural network for a function like language translation for an intelligent agent, where the underlying mechanisms of AI operation need not be understood as long as outcomes are favorably perceived by users, while a more transparent model or system and a simpler neural network can be used for a system for automated governance, where a greater understanding of how inputs are translated to outputs can be needed to comply with regulations or policies.

Examples of the models include recurrent neural networks (RNNs) such as long short-term memory (LSTM), deep learning models such as transformers, decision trees, support-vector machines, genetic algorithms, Bayesian networks, and regression analysis. Examples of systems based on a transformer model include bidirectional encoder representations from transformers (BERT) and generative pre-trained transformers (GPT). Training a machine-learning model can include supervised learning (for example, based on labelled input data), unsupervised learning, and reinforcement learning. In various embodiments, a machine-learning model can be pre-trained by their operator or by a third party. Problem domains include nearly any situation where structured data can be collected, and includes natural language processing (NLP), computer vision (CV), classification, image recognition, etc. Some or all of the software can run in a virtual environment rather than directly on hardware. The virtual environment can include a hypervisor, emulator, sandbox, container engine, etc. The software can be built as a virtual machine, a container, etc. Virtualized resources can be controlled using, for example, a DOCKER container platform, a pivotal cloud foundry (PCF) platform, etc. Some or all of the software can be logically partitioned into microservices. Each microservice offers a reduced subset of functionality. In various embodiments, each microservice can be scaled independently depending on load, either by devoting more resources to the microservice or by instantiating more instances of the microservice. In various embodiments, functionality offered by one or more microservices can be combined with each other and/or with other software not adhering to a microservices model.

In some implementations, any suitable computer usable or computer readable medium (or media) can be utilized. The computer readable medium can be a computer readable signal medium or a computer readable storage medium. The computer-usable, or computer-readable, storage medium (including a storage device associated with a computing device or client electronic device) can be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium or storage device can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, solid state drives (SSDs), a digital versatile disk (DVD), a Blu-ray disc, and an Ultra HD Blu-ray disc, a static random access memory (SRAM), dynamic RAM (DRAM), synchronous DRAM (SDRAM), synchronous graphics RAM (SGRAM), and video RAM (VRAM), analog magnetic tape, digital magnetic tape, rotating hard disk drive (HDDs), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium can be any tangible medium that can contain or store a program for use by or in connection with the instruction execution system, apparatus, or device.

Examples of storage implemented by the storage hardware include a distributed ledger, such as a permissioned or permissionless blockchain. Entities recording transactions, such as in a blockchain, can reach consensus using an algorithm such as proof-of-stake, proof-of-work, and proof-of-storage.

In some implementations, a computer readable signal medium can include a propagated data signal with computer readable program code embodied therein, for example, in baseband or as part of a carrier wave. In some implementations, such a propagated signal can take any of a variety of forms, including, but not limited to, electro-magnetic, optical, or any suitable combination thereof. In some implementations, the computer readable program code can be transmitted using any appropriate medium, including but not limited to the internet, wireline, optical fiber cable, RF, etc. In some implementations, a computer readable signal medium can be any computer readable medium that is not a computer readable storage medium and that can communicate, propagate, or transport a program for use by or in connection with an instruction execution system, apparatus, or device.

In some implementations, computer program code for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure can also be written in conventional procedural programming languages, such as the "C" programming language, PASCAL, or similar programming languages, as well as in scripting languages such as JavaScript, PERL, or Python. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through a network, such as a cellular network, local area network (LAN), a wide area network (WAN), a body area network BAN), a personal area network (PAN), a metropolitan area network (MAN), etc., or the connection can be made to an external computer (for example, through the internet using an Internet Service Provider). The networks can include one or more of point-to-point and mesh technologies. Data transmitted or received by the networking components can traverse the same or different networks. Networks can be connected to each other over a WAN or point-to-point leased lines using technologies such as Multiprotocol Label Switching (MPLS) and virtual private networks (VPNs), etc. In some implementations, electronic circuitry including, for example, programmable logic circuitry, an application specific integrated circuit (ASIC), gate arrays such as field-programmable gate arrays (FPGAs) or other hardware accelerators, micro-controller units (MCUs), or programmable logic arrays (PLAs), integrated circuits (ICs), digital circuit elements, analog circuit elements, combinational logic circuits, digital signal processors (DSPs), complex programmable logic devices (CPLDs), etc. can execute the computer readable program instructions/code by utilizing state information of the computer readable program instructions to personalize the electronic circuitry, in order to perform aspects of the present disclosure. Multiple components of the hardware can be integrated, such as on a single die, in a single package, or on a single printed circuit board or logic board. For example, multiple components of the hardware can be implemented as a system-on-chip. A component, or a set of integrated components, can be referred to as a chip, chipset, chiplet, or chip stack. Examples of a system-on-chip include a radio frequency (RF) system-on-chip, an artificial intelligence (AI) system-on-chip, a video processing system-on-chip, an organ-on-chip, a quantum algorithm system-on-chip, etc.

Examples of processing hardware can include a central processing unit (CPU), a graphics processing unit (GPU), an approximate computing processor, a quantum computing processor, a parallel computing processor, a neural network processor, a signal processor, a digital processor, a data processor, an embedded processor, a microprocessor, and a co-processor. The co-processor can provide additional processing functions and/or optimizations, such as for speed or power consumption. Examples of a co-processor include a math co-processor, a graphics co-processor, a communication co-processor, a video co-processor, and an AI co-processor.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, can represent a module, segment, or portion of code, which comprises one or more executable computer program instructions for implementing the specified logical function (s)/act(s). These computer program instructions can be provided to a processor of a general purpose computer, special purpose computer, or other programmable data processing apparatus to produce a machine, such that the computer program instructions, which can execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) can occur out of the order noted in the figures (or combined or omitted). For example, two blocks shown in succession can, in fact, be executed substantially concurrently, or the blocks can sometimes be executed in the reverse order, depending upon the functionality involved.

In some implementations, these computer program instructions can also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions can also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown switch process 110 that may reside on and may be executed by a computer (e.g., computer 112), which may be connected to a network (e.g., network 114) (e.g., the internet or a local area network). Examples of computer 112 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer (s), or a computing cloud(s). A SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 112 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a switch process, such as switch process 110 of FIG. 1, may monitor a plurality of signals as input from a switch. It may be detected whether a current state of the switch is valid based upon, at least in part, the plurality of signals. When the current state of the switch is valid, use of the current state of the switch may be enabled as an output. When the current state of the switch is invalid, use of the current state of the switch may be disabled as the output.

In some implementations, the instruction sets and subroutines of switch process 110, which may be stored on storage device, such as storage device 116, coupled to computer 112, may be executed by one or more processors and one or more memory architectures included within computer 112. In some implementations, storage device 116 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 116 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 114 may be connected to one or more secondary networks (e.g., network 118), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 112 may include a data store, such as a database (e.g., relational database, object-oriented database, triplestore database, etc.), a data store, a data lake, a column store, and/or a data warehouse, and may be located within any suitable memory location, such as storage device 116 coupled to computer 112. In some implementations, data, metadata, information, etc. described throughout the present disclosure may be stored in the data store. In some implementations, computer 112 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, switch process 110 may be a component of the data store, a standalone application that interfaces with the above noted data store and/or an applet/application that is accessed via client applications 122, 124, 126, 128. In some implementations, the above noted data store may be, in whole or in part, distributed in a cloud computing topology. In this way, computer 112 and storage device 116 may refer to multiple devices, which may also be distributed throughout the network.

In some implementations, computer 112 may execute a switch application (e.g., switch application 120), examples of which may include, but are not limited to, e.g., an aircraft rotor safety switch application, a cooling system application (e.g., a switch for supplying power to a cooling pump for a reactor), a general toggle switch application, or other application or safety critical application that involves monitoring a state of a switch and not causing downstream changes in logic to be enabled because of a potential false switch in state status. In some implementations, switch process 110 and/or switch application 120 may be accessed via one or more of client applications 122, 124, 126, 128, which in some implementations, may be the end device wired into and being controlled by the switch circuitry. In some implementations, switch process 110 may be a standalone application, or may be an applet/application/script/extension that may interact with and/or be executed within switch application 120, a component of switch application 120, and/or one or more of client applications 122, 124, 126, 128. In some implementations, switch application 120 may be a standalone application, or may be an applet/application/script/extension that may interact with and/or be executed within switch process 110, a component of switch process 110, and/or one or more of client applications 122, 124, 126, 128. In some implementations, one or more of client applications 122, 124, 126, 128 may be a standalone application, or may be an applet/application/script/extension that may interact with and/or be executed within and/or be a component of switch process 110 and/or switch application 120.

Examples of client applications 122, 124, 126, 128 may include, but are not limited to, e.g., an aircraft rotor safety switch application, a cooling system application (e.g., a switch for supplying power to a cooling pump for a reactor), a general toggle switch application, or other application or safety critical application that involves monitoring a state of a switch and not causing downstream changes in logic to be enabled because of a potential false switch in state status), a textual and/or a graphical user interface, a customized web browser, a plugin, an Application Programming Interface (API), or a custom application. The instruction sets and subroutines of client applications 122, 124, 126, 128, which may be stored on storage devices 130, 132, 134, 136, coupled to client electronic devices 138, 140, 142, 144, may be executed by one or more processors and one or more memory architectures incorporated into client electronic devices 138, 140, 142, 144.

In some implementations, one or more of storage devices 130, 132, 134, 136, may include but are not limited to: hard disk drives; flash drives, tape drives; optical drives; RAID arrays; random access memories (RAM); and read-only memories (ROM).

Examples of client electronic devices 138, 140, 142, 144 (and/or computer 112) may include, but are not limited to, a laptop computer or other personal computer (e.g., client electronic device 138), an aerial, water-based, or land-based vehicle (e.g., client electronic device 140), a smart/data-enabled, cellular phone (e.g., client electronic device 142), a notebook computer (e.g., client electronic device 144), a tablet, a server, a television, a smart television, a smart speaker, an Internet of Things (IoT) device, a media (e.g., audio/video, photo, etc.) capturing and/or output device, an audio input and/or recording device (e.g., a handheld microphone, a lapel microphone, an embedded microphone/speaker (such as those embedded within eyeglasses, smart phones, tablet computers, smart televisions, smart speakers, watches, etc.), an infotainment device (e.g., such as those found in vehicles combining information and/or entertainment with optional screens and/or audio for such things as navigation, multimedia, connectivity, a toggle switch, vehicles (e.g., manned or unmanned aircraft, water vessels, land vehicles, etc.) voice control, smartphone integration, touchscreen interface, internet and apps, rear-seat entertainment, etc.), a dedicated network device, and combinations thereof. Client electronic devices 138, 140, 142, 144 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 122, 124, 126, 128 may be configured to effectuate some or all of the functionality of switch process 110 (and vice versa). Accordingly, in some implementations, switch process 110 may be a purely server-side application, a purely client-side application, or a hybrid server-side/client-side application that is cooperatively executed by one or more of client applications 122, 124, 126, 128 and/or switch process 110.

In some implementations, one or more of client applications 122, 124, 126, 128 may be configured to effectuate some or all of the functionality of switch application 120 (and vice versa). Accordingly, in some implementations, switch application 120 may be a purely server-side application, a purely client-side application, or a hybrid server-side/client-side application that is cooperatively executed by one or more of client applications 122, 124, 126, 128 and/or switch application 120. As one or more of client applications 122, 124, 126, 128, switch process 110, and switch application 120, taken singly or in any combination, may effectuate some or all of the same functionality, any description of effectuating such functionality via one or more of client applications 122, 124, 126, 128, switch process 110, switch application 120, or combination thereof, and any described interaction(s) between one or more of client applications 122, 124, 126, 128, switch process 110, switch application 120, or combination thereof to effectuate such functionality, should be taken as an example only and not to limit the scope of the disclosure.

In some implementations, one or more of users 146, 148, 150, 152 may access computer 112 and switch process 110 (e.g., using one or more of client electronic devices 138, 140, 142, 144) directly through network 114 or through network 118. Further, computer 112 may be connected to network 114 through network 118, as illustrated with phantom link line 154. Switch process 110 may include one or more user interfaces, such as browsers and textual or graphical user interfaces, through which users 146, 148, 150, 152 may access switch process 110.

In some implementations, the various client electronic devices may be directly or indirectly coupled to network 114 (or network 118). For example, client electronic device 138 is shown directly coupled to network 114 via a hardwired network connection. Further, client electronic device 144 is shown directly coupled to network 118 via a hardwired network connection. Client electronic device 140 is shown wirelessly coupled to network 114 via wireless communication channel 156 established between client electronic device 140 and wireless access point (i.e., WAP 158), which is shown directly coupled to network 114. WAP 158 may be, for example, an IEEE 802.11a, 802.11b, 802.11g, 802.11n, 802.11ac, Wi-Fi®, RFID, and/or Bluetooth™ (including Bluetooth™ Low Energy) or any device that is capable of establishing wireless communication channel 156 between client electronic device 140 and WAP 158. Client electronic device 142 is shown wirelessly coupled to network 114 via wireless communication channel 160 established between client electronic device 142 and cellular network/bridge 162, which is shown by example directly coupled to network 114.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices (e.g., toggle switches) to be interconnected using a short-range wireless connection. Other forms of interconnection (e.g., Near Field Communication (NFC)) may also be used. In some implementations, computer 112 may be directed or controlled by an operator. Computer 112 may be hosted by one or more of assets owned by the operator, assets leased by the operator, and third-party assets. The assets may be referred to as a private, community, or hybrid cloud computing network or cloud computing environment. For example, computer 112 may be partially or fully hosted by a third-party offering software as a service (SaaS), platform as a service (PaaS), and/or infrastructure as a service (IaaS). Computer 112 may be implemented using agile development and operations (DevOps) principles. In some implementations, some or all of computer 112 may be implemented in a multiple-environment architecture. For example, the multiple environments may include one or more production environments, one or more integration environments, one or more development environments, etc.

In some implementations, various I/O requests (e.g., I/O request 115) may be sent from, e.g., client applications 122, 124, 126, 128 to, e.g., computer 112 (and vice versa). Examples of I/O request 115 may include but are not limited to, data write requests (e.g., a request that content be written to computer 112) and data read requests (e.g., a request that content be read from computer 112). Client electronic devices 138, 140, 142, 144 and/or computer 112 may also communicate audibly using an audio codec, which may receive spoken information from a user and convert it to usable digital information. An audio codec may likewise generate audible sound for a user, such as through a speaker, e.g., in a handset of a client electronic device. Such sound may include sound from voice telephone calls, may include recorded sound (e.g., voice messages, music files, etc.) and may also include sound generated by applications operating on the client electronic devices.

Figure 2:
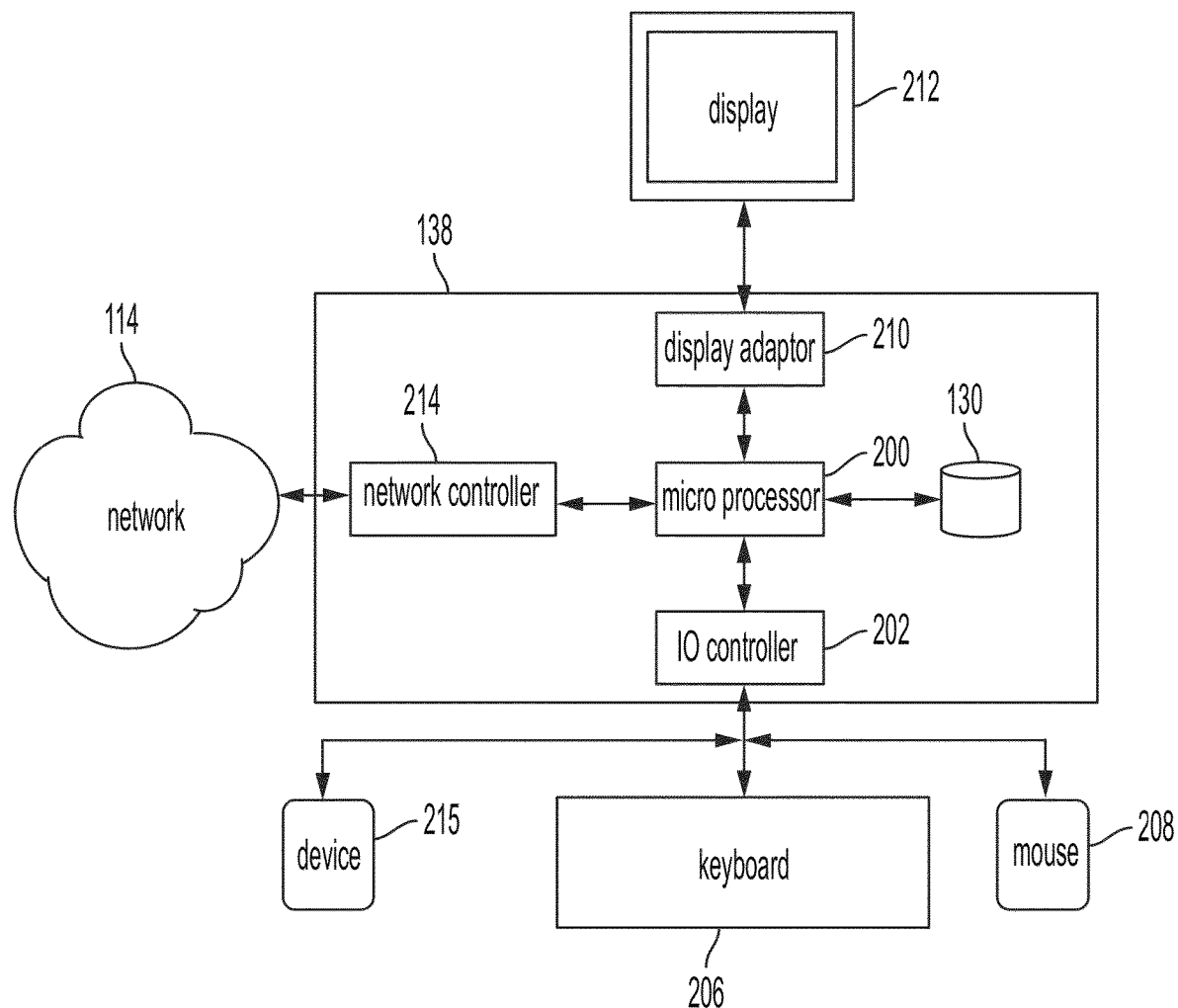
FIG. 2 is an example diagrammatic view of a client electronic device of FIG. 1 according to one or more example implementations of the disclosure.

Referring also to the example implementation of FIG. 2, there is shown a diagrammatic view of client electronic device 138. While client electronic device 138 is shown in this figure, this is for example purposes only and is not intended to be a limitation of this disclosure, as other configurations are possible. Additionally, any computing device capable of executing, in whole or in part, switch process 110 may be substituted for client electronic device 138 (in whole or in part) within FIG. 2, examples of which may include but are not limited to computer 112 and/or one or more of client electronic devices 138, 140, 142, 144.

In some implementations, client electronic device 138 may include a processor (e.g., microprocessor 200) configured to, e.g., process data and execute the above-noted code/instruction sets and subroutines. Microprocessor 200 may be coupled via a storage adaptor to the above-noted storage device(s) (e.g., storage device 130). An I/O controller (e.g., I/O controller 202) may be configured to couple microprocessor 200 with various devices (e.g., via wired or wireless connection), such as keyboard 206, pointing/selecting device (e.g., touchpad, touchscreen, mouse 208, etc.), scanner, custom device (e.g., device 215, such as a toggle switch), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to network 114 (e.g., the Internet or a local area network).

Figure 3:
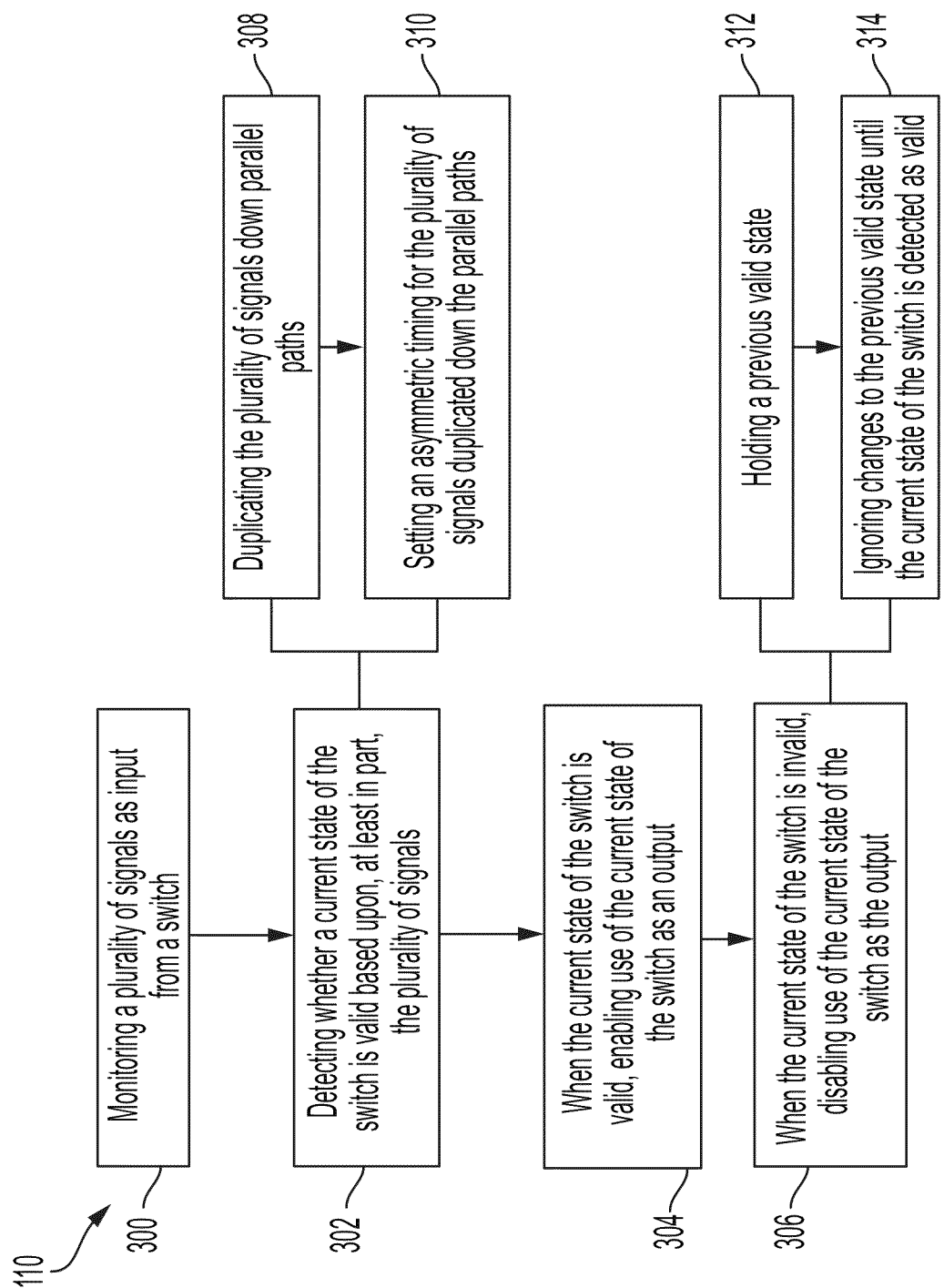
FIG. 3 is an example flowchart of a switch process according to one or more example implementations of the disclosure.

As discussed above and referring also at least to the example implementations of FIG. 3, switch process 110 may monitor 300 a plurality of signals as input from a switch. Switch process 110 may detect 302 whether a current state of the switch is valid based upon, at least in part, the plurality of signals. When the current state of the switch is valid, switch process 110 may enable 304 use of the current state of the switch as an output. When the current state of the switch is invalid, switch process 110 may disable 306 use of the current state of the switch as the output.

Figure 4:
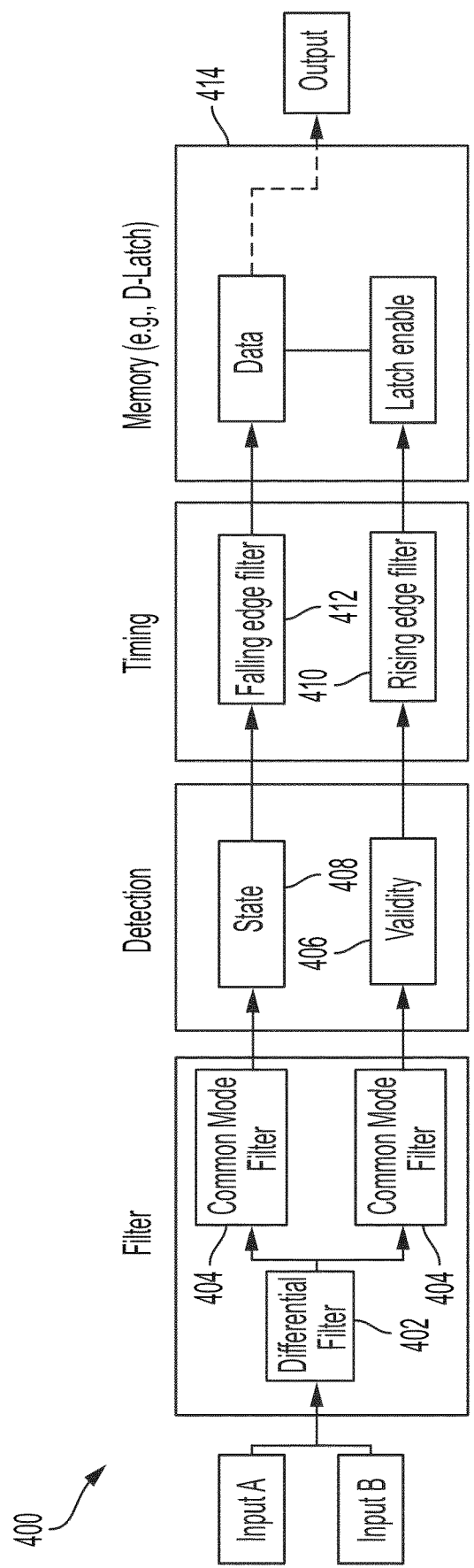
FIG. 4 is an example diagrammatic view of a safety switch circuit according to one or more example implementations of the disclosure.

In some implementations, switch process 110 may monitor 300 a plurality of signals as input from a switch. For instance, and referring at least to the example implementation of FIG. 4, an example diagrammatic figure of a safety switch circuit (e.g., safety switch circuit 400) is shown. In the example, two input signals are received (e.g., Input A and Input B). In some implementations, the two input signals may be filtered using, e.g., a differential filter (e.g., differential filter 402 such as a low pass differential filter) and common mode filter (e.g., common mode filter 404). In some implementations, the cutoff frequency of these filters may be determined by use, and for example purposes only, may be for hand operated switches with a rise time of signals being kept between 1 ms and 250 ms.

In some implementations, switch process 110 may detect 302 whether a current state of the switch is valid based upon, at least in part, the plurality of signals. For instance, and still referring to FIG. 4, the second stage of safety switch circuit 400 may detect the validity and state of the input. In some implementations, detecting whether the current state of the switch is valid may include duplicating 308 the plurality of signals down parallel paths. For instance, in this stage, the complementary pair of signals are duplicated, and each pair takes parallel paths through the next stages. Both A and B signals are passed to the validity detection (e.g., validity section 406) as well as the state detection (e.g., state section 408).

In some implementations, the current state of the switch may be valid when a first signal of the plurality of signals is complementary to a second signal of the plurality of signals. For instance, and referring still to FIG. 4, safety switch circuit 400 may detect if the input signals A and B are complementary (e.g., 10 or 01) or the same. These are the only two valid states and represent on/off or equivalent. The output of these two detection stages is then independently passed to the timing stage, while maintaining parallel paths. If the signals are complementary, the output of the validity stage is true. If the signals are the same, the output is false, and consequently an invalid bit is set true, which may alert a user to the issue (e.g., via a visual alert such as an LED, a text message, an email, a pop-up message, etc. sent to a user's client electronic device).

In some implementations, asymmetric timing may be set 310 for the plurality of signals duplicated down the parallel paths. For instance, and referring still to FIG. 4, the timing stage (e.g., via switch process 110) sets the timing relationship between the validity bit and the state data. In some implementations, the timing on these signals is asymmetric, acting only on the rising edge (e.g., via rising edge filter 410) of the validity bit and the falling edge (e.g., via falling edge filter 412) of the state data. This is done to allow the state data to settle before and after the validity input transitions to the D-latch. The timing filters are designed to slow the latch enable line (validity bit of the rising edge filter 410) on transition from low to high, and the data (state data) falling edge filter 412 slows the transition from high to low.

In some implementations, when the current state of the switch is valid, switch process 110 may enable 304 use of the current state of the switch as an output. For instance, and referring still to FIG. 4, the final stage of switch process 110 may use the state and validity bit as two inputs to memory (e.g., a D-latch, such as D-latch 414). The validity bit is used as the clock signal and the state is used as the data. When the validity bit in latch enable 416 is true, the data from data 418 is allowed to pass through to the output of D-latch 414 yielding a simple logic signal to determine the state. In other words, if the validity check was invalid, a clock line has gone low on the D-latch, which means that the previous state will just stay here, and no new data can come through. It will be appreciated after reading the present disclosure that while a D-latch is described, any type of memory may be used without departing from the scope of the present disclosure. As such, the use of any particular type of memory, such as a D-latch, should be taken as example only and not to otherwise limit the scope of the present disclosure.

In some implementations, when the current state of the switch is invalid, switch process 110 may disable 306 use of the current state of the switch as the output. For instance, in some implementations, disabling use of the current state of the switch as the output may include holding 312 a previous valid state and/or ignoring 314 changes to the previous valid state until the current state of the switch is detected as valid. For instance, as the opposite of the above example, if the validity bit is false, the D-latch will hold the previous valid state and/or ignore all further state input changes until the validity bit is true again. This prevents unwanted state changes by disallowing invalid states to propagate to the output through D-latch 414.

It will be appreciated after reading the present disclosure that while a D-latch is used, other components that can accomplish the same or similar functionality, such as a D flip-flop (or even a memory device that determines if the state is valid where data can pass right through), may be used without departing from the scope of the present disclosure. As such, the use of a D-latch should be taken as example only and not to otherwise limit the scope of the present disclosure.

Therefore, safety switch circuit 400 increases the robustness of, e.g., a toggle switch input to avoid inadvertent switching or errors caused by short circuits, disconnects, switch bounces, or switch failures. Safety switch circuit 400 incorporates digital logic circuits to detect input switching events, propagates valid state changes, detects invalid states, and latches valid states if an input error is detected.

Figure 5A:
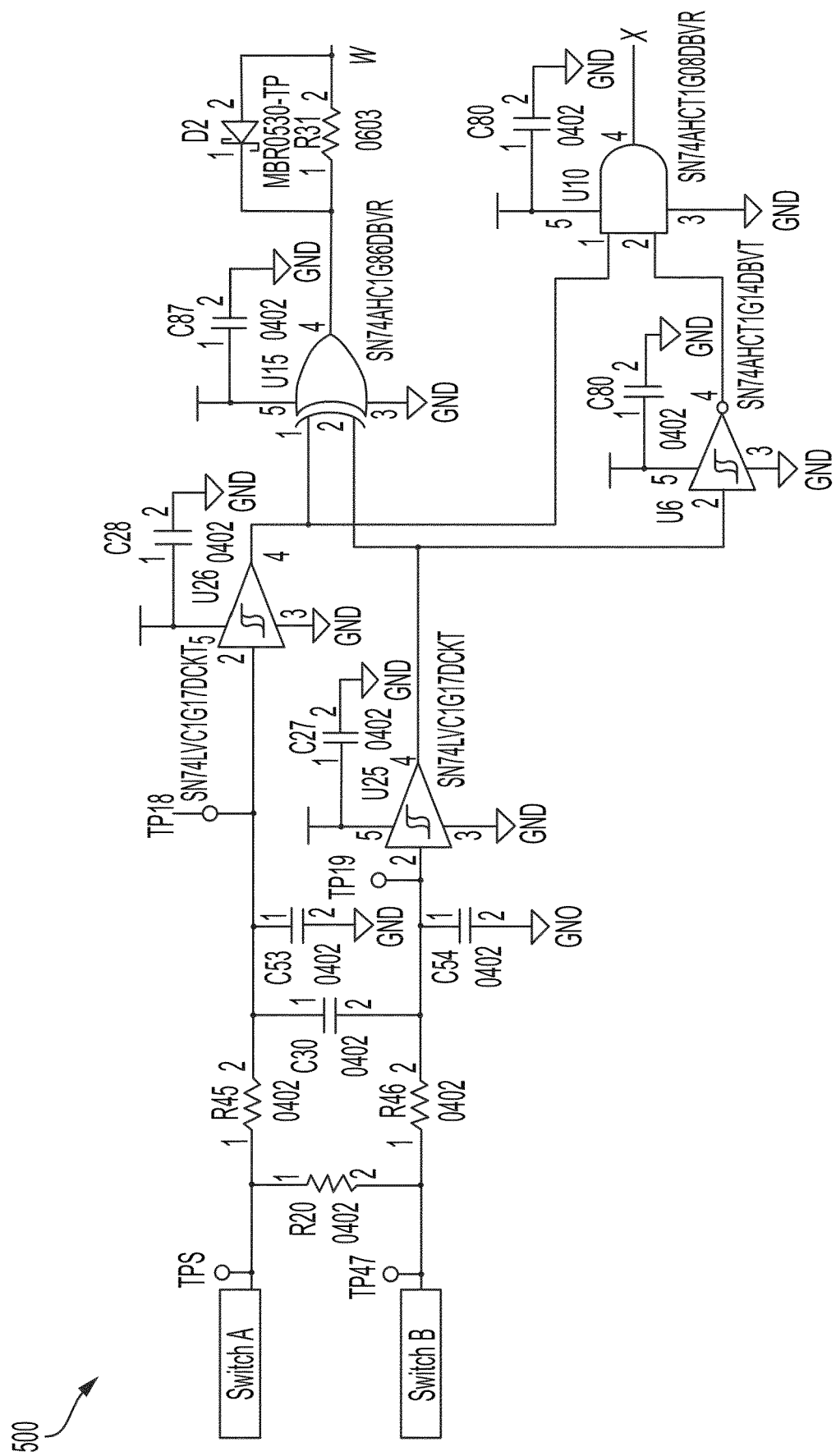
FIGS. 5A-5B is an example diagrammatic view of a safety switch circuit according to one or more example implementations of the disclosure.
Figure 5B:
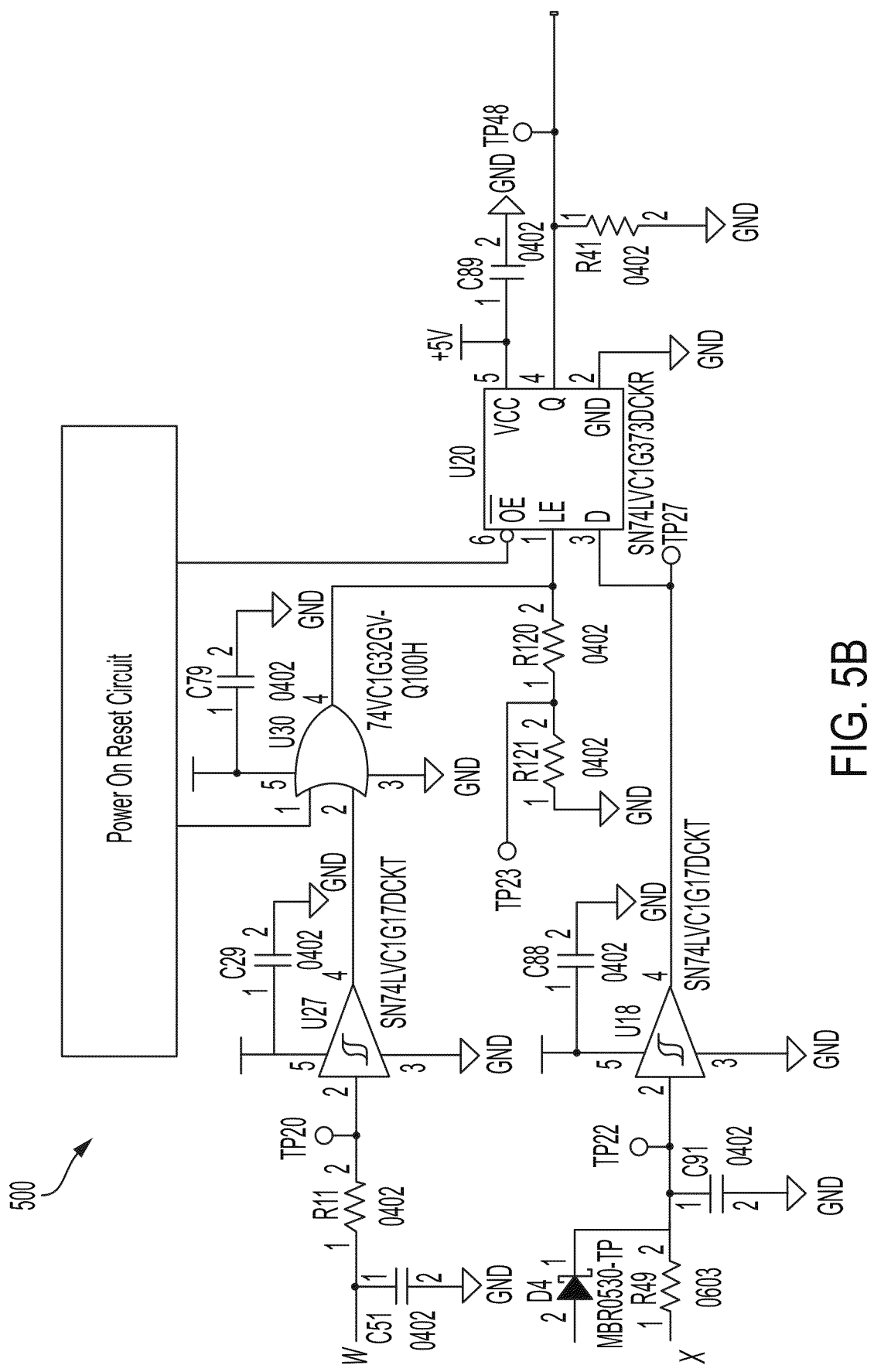

Referring to the example implementations of FIGS. 5A-5B, a more detailed circuit of safety switch circuit 500 of safety switch circuit 400 is shown. As will be appreciated after reading the present disclosure, the exact design, components used, and input values may be modified, added, removed, and/or replaced without departing from the scope of the present disclosure. As such, the precise design shown in FIGS. 5A-5B should be taken as example only and not to otherwise limit the scope of the present disclosure.

In some implementations, the power on reset circuit is shown. The example objective of this portion of safety switch circuit 500 is to capture the state of the switch when the system is powered on or reset. This portion of safety switch circuit 500 sets the enable pin of a D-latch in order to capture the state of the data (D) pin of the D-latch. Once the data is latched, the output of the D-latch is driven low and enabled.

Example and Non-Limiting Power on Reset Timing Summary

T=0 MS: System power on, U20 output disabled
T=10 MS: power stable detected
T=100 MS: latch enable driven high to allow current switch state to pass through to output
T=120 MS: latch enable is returned to control of validity logic
T=190 MS: U20 output enabled Referring at least to FIG. 5A inputs A and B coming in from switch A and switch B to the filter and then validity check. In the example, it is an exclusive OR (XOR) gate, meaning it must be a 1 and a 0 or a 0 and a 1 that is propagated through another set of filtering. D2, R31 and C51, etc. is part of the timing, rising edge and falling edge filter, which is setting up to make sure that one happens before the other. That propagates through another buffer, and then into the XOR gate, the XOR gate has been also driven by this power on reset. As a result, there is the XOR coming through driving all the way into the latch enable which is blocking input. On the data side, these two signals are also coming down through the data side, and to do that, any component similar to an inverting buffer going into an AND gate may be used. Thus, there will be a 1 and a 0, which would drive the 1 and 1, resulting in having a 1 and 1 coming into the AND gate, and now the AND gate is high, and that propagates through another trigger going into the data line. The result is that the state is determined right there with those components, and that propagates directly through to the data. Then, Q will be whatever the data is, as long as the latch enable is high, so as long as the state change has been verified as valid, new data can come through and propagate all the way through. Otherwise, the prior valid state will be held, preventing further state changes until a new valid state change is detected.

It will be appreciated after reading the preset disclosure that the timing constraints within any of the above-noted parameter areas may be changed without departing from the scope of the present disclosure. It will also be appreciated after reading the present disclosure that the input filtering stage is optimized per application based on how the input may be connected or what external interference the circuit is attempting to protect from. The timing may also be tuned for the specific application without altering the overall design of the system. It will further be appreciated after reading the present disclosure that any number of ones and zeros may be used as the only valid state for a more complex design, where it would be desirable to validate against each other input. As such, any modifications that maintain the ability to validate that there was only one state that is going to be allowed to propagate through to an output should be considered within the scope of the present disclosure. For instance, the present disclosure may be further designed using a CPLD or an FPGA and describe it using HLD (e.g., written using Verilog) and compress safety switch circuit 500 down into a CPLD, which could expand safety switch circuit 500 to a large number of inputs that may be defined as the desired valid state is to pass data through.

While the present disclosure is described using a UAV with the safety switch, it will be appreciated after reading the present disclosure that other uses where one would want to make sure one is monitoring the state of a switch and not causing downstream changes in incorrect logic may also be used without departing from the scope of the present disclosure. For instance, cooling for a cooling system may use a switch for supplying power to a cooling pump for a reactor, and if for any reason the logic is faulty, rather than shutting down the cooling pump, the safety switch of the present disclosure may continue the operating state without propagating the faulty logic.

Clause 1. A computer-implemented method comprising: monitoring a plurality of signals as input from a switch; detecting whether a current state of the switch is valid based upon, at least in part, the plurality of signals; when the current state of the switch is valid, enabling use of the current state of the switch as an output; and when the current state of the switch is invalid, disabling use of the current state of the switch as the output.

Clause 2. The computer-implemented method of any of clauses 1-7, wherein the current state of the switch is valid when a first signal of the plurality of signals is complementary to a second signal of the plurality of signals.

Clause 3. The computer-implemented method of any of clauses 1-7, wherein disabling use of the current state of the switch as the output includes holding a previous valid state.

Clause 4. The computer-implemented method of any of clauses 1-7, wherein disabling use of the current state of the switch as the output further includes ignoring changes to the previous valid state until the current state of the switch is detected as valid.

Clause 5. The computer-implemented method of any of clauses 1-7, wherein the previous valid state is held in memory.

Clause 6. The computer-implemented method of any of clauses 1-7, wherein detecting whether the current state of the switch is valid includes duplicating the plurality of signals down parallel paths.

Clause 7. The computer-implemented method of any of clauses 1-7, further comprising setting an asymmetric timing for the plurality of signals duplicated down the parallel paths.

Clause 8. A computer program product residing on a computer readable storage medium having a plurality of instructions stored thereon which, when executed across one or more processors, causes at least a portion of the one or more processors to perform operations comprising: monitoring a plurality of signals as input from a switch; detecting whether a current state of the switch is valid based upon, at least in part, the plurality of signals; when the current state of the switch is valid, enabling use of the current state of the switch as an output; and when the current state of the switch is invalid, disabling use of the current state of the switch as the output.

Clause 9. The computer program product of any of clauses 8-14, wherein the current state of the switch is valid when a first signal of the plurality of signals is complementary to a second signal of the plurality of signals.

Clause 10. The computer program product of clauses 8-14, wherein disabling use of the current state of the switch as the output includes holding a previous valid state.

Clause 11. The computer program product of clauses 8-14, wherein disabling use of the current state of the switch as the output further includes ignoring changes to the previous valid state until the current state of the switch is detected as valid.

Clause 12. The computer program product of clauses 8-14, wherein the previous valid state is held in memory.

Clause 13. The computer program product of clauses 8-14, wherein detecting whether the current state of the switch is valid includes duplicating the plurality of signals down parallel paths.

Clause 14. The computer program product of clauses 8-14, further comprising setting an asymmetric timing for the plurality of signals duplicated down the parallel paths.

Clause 15. A circuit configured to perform operations comprising: monitoring a plurality of signals as input from a switch; detecting whether a current state of the switch is valid based upon, at least in part, the plurality of signals; when the current state of the switch is valid, enabling use of the current state of the switch as an output; and when the current state of the switch is invalid, disabling use of the current state of the switch as the output.

Clause 16. The circuit of clauses 15-21, wherein the current state of the switch is valid when a first signal of the plurality of signals is complementary to a second signal of the plurality of signals.

Clause 17. The circuit of clauses 15-21, wherein disabling use of the current state of the switch as the output includes holding a previous valid state.

Clause 18. The circuit of clauses 15-21, wherein disabling use of the current state of the switch as the output further includes ignoring changes to the previous valid state until the current state of the switch is detected as valid.

Clause 19. The circuit of clauses 15-21, wherein detecting whether the current state of the switch is valid includes duplicating the plurality of signals down parallel paths.

Clause 20. The circuit of clauses 15-21, further comprising setting an asymmetric timing for the plurality of signals duplicated down the parallel paths.

Clause 21. The circuit of clauses 15-21, wherein the previous valid state is held in memory.

The terminology used herein is for the purpose of describing particular implementations only and is not intended to be limiting of the disclosure. As used herein, the singular forms "a", "an" and "the" are intended to include the plural forms as well, including any steps performed by a/the computer/processor, unless the context clearly indicates otherwise. As used herein, the phrase "at least one of A, B, and C" should be construed to mean a logical (A OR B OR C), using a non-exclusive logical OR, and should not be construed to mean "at least one of A, at least one of B, and at least one of C." As another example, the language "at least one of A and B" (and the like) as well as "at least one of A or B" (and the like) should be interpreted as covering only A, only B, or both A and B, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof. Example sizes/models/values/ranges can have been given, although examples are not limited to the same.

The terms (and those similar to) "coupled," "attached," "connected," "adjoining," "transmitting," "receiving," "connected," "engaged," "coupled," "adjacent," "next to," "on top of," "above," "below," "abutting," and "disposed," used herein is to refer to any type of relationship, direct or indirect, between the components in question, and is to apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action is to occur, either in a direct or indirect manner. The term "set" does not necessarily exclude the empty set—in other words, in some circumstances a "set" can have zero elements. The term "non-empty set" can be used to indicate exclusion of the empty set—that is, a non-empty set must have one or more elements, but this term need not be specifically used. The term "subset" does not necessarily require a proper subset. In other words, a "subset" of a first set can be coextensive with (equal to) the first set. Further, the term "subset" does not necessarily exclude the empty set—in some circumstances a "subset" can have zero elements.

The corresponding structures, materials, acts, and equivalents (e.g., of all means or step plus function elements) that can be in the claims below are intended to include any structure, material, or act for performing the function in combination with other claimed elements as specifically claimed. While the disclosure describes structures corresponding to claimed elements, those elements do not necessarily invoke a means plus function interpretation unless they explicitly use the signifier "means for." Unless otherwise indicated, recitations of ranges of values are merely intended to serve as a shorthand way of referring individually to each separate value falling within the range, and each separate value is hereby incorporated into the specification as if it were individually recited. While the drawings divide elements of the disclosure into different functional blocks or action blocks, these divisions are for illustration only. According to the principles of the present disclosure, functionality can be combined in other ways such that some or all functionality from multiple separately-depicted blocks can be implemented in a single functional block; similarly, functionality depicted in a single block can be separated into multiple blocks. Unless explicitly stated as mutually exclusive, features depicted in different drawings can be combined consistent with the principles of the present disclosure.

The description of the present disclosure has been presented for purposes of illustration and description but is not intended to be exhaustive or limited to the disclosure in the form disclosed. After reading the present disclosure, many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated. The features of any dependent claim can be combined with the features of any of the independent claims or other dependent claims.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
    detecting whether a current state of a switch is valid based upon, at least in part, a plurality of signals as input from the switch;
    when the current state of the switch is valid, enabling use of the current state of the switch as an output; and
    when the current state of the switch is invalid, disabling use of the current state of the switch as the output,
        wherein disabling use of the current state of the switch as the output includes holding a previous valid state in memory.

2. The computer-implemented method of claim 1, wherein the current state of the switch is valid when a first signal of the plurality of signals is complementary to a second signal of the plurality of signals.

3. The computer-implemented method of claim 1, wherein disabling use of the current state of the switch as the output further includes ignoring changes to the previous valid state until the current state of the switch is detected as valid.

4. The computer-implemented method of claim 1, wherein detecting whether the current state of the switch is valid includes duplicating the plurality of signals down parallel paths.

5. The computer-implemented method of claim 4, further comprising:
setting an asymmetric timing for the plurality of signals duplicated down the parallel paths.

6. The method of claim 1, wherein the memory is a data latch (D-latch).

7. The method of claim 1, further comprising:
filtering two input signals, from the plurality of signals, using one or more of a differential filter and common mode filter.

8. A computer program product residing on a computer readable storage medium having a plurality of instructions stored thereon which, when executed across one or more processors, causes at least a portion of the one or more processors to:
detect whether a current state of a switch is valid based upon, at least in part, a plurality of signals as input from the switch;
when the current state of the switch is valid, enable use of the current state of the switch as an output; and
when the current state of the switch is invalid, disable use of the current state of the switch as the output,
wherein the plurality of instructions, cause the one or more processors to:
hold a previous valid state in memory.

9. The computer program product of claim 8, wherein the current state of the switch is valid when a first signal of the plurality of signals is complementary to a second signal of the plurality of signals.

10. The computer program product of claim 8, wherein the plurality of instructions, that cause the one or more processors to disable use of the current state of the switch as the output, cause the one or more processors to:
ignore changes to the previous valid state until the current state of the switch is detected as valid.

11. The computer program product of claim 8, wherein the plurality of instructions, that cause the one or more processors to detect whether the current state of the switch is valid, cause the one or more processors to:
duplicate the plurality of signals down parallel paths.

12. The computer program product of claim 11, wherein the plurality of instructions further cause the one or more processors to:
set an asymmetric timing for the plurality of signals duplicated down the parallel paths.

13. The computer program product of claim 8, wherein the plurality of instructions further cause the one or more processors to:
filter two input signals, from the plurality of signals, using one or more of a differential filter and a common mode filter.

14. The computer program product of claim 8, wherein the memory is a data latch (D-latch).

15. A circuit comprising:
one or more processors configured to:
detect whether a current state of a switch is valid based upon, at least in part, a plurality of signals from the switch;
when the current state of the switch is valid, enable use of the current state of the switch as an output; and
when the current state of the switch is invalid, disable use of the current state of the switch as the output,
wherein the one or more processors, when disabling use of the current state of the switch as the output, are to:
hold a previous valid state in memory.

16. The circuit of claim 15, wherein the current state of the switch is valid when a first signal of the plurality of signals is complementary to a second signal of the plurality of signals.

17. The circuit of claim 15, wherein disabling use of the current state of the switch as the output further includes ignoring changes to the previous valid state until the current state of the switch is detected as valid.

18. The circuit of claim 15, wherein detecting whether the current state of the switch is valid includes duplicating the plurality of signals down parallel paths.

19. The circuit of claim 18, further comprising setting an asymmetric timing for the plurality of signals duplicated down the parallel paths.

20. The circuit of claim 15, wherein the one or more processors are further configured to:
filter two input signals, from the plurality of signals, using one or more of a differential filter and a common mode filter.

* * * * *